Oct. 13, 1964    R. FIELDEN    3,152,567
METHOD OF FORMING TUBES WITH A HELICAL FIN
Filed Nov. 9, 1960    2 Sheets-Sheet 1
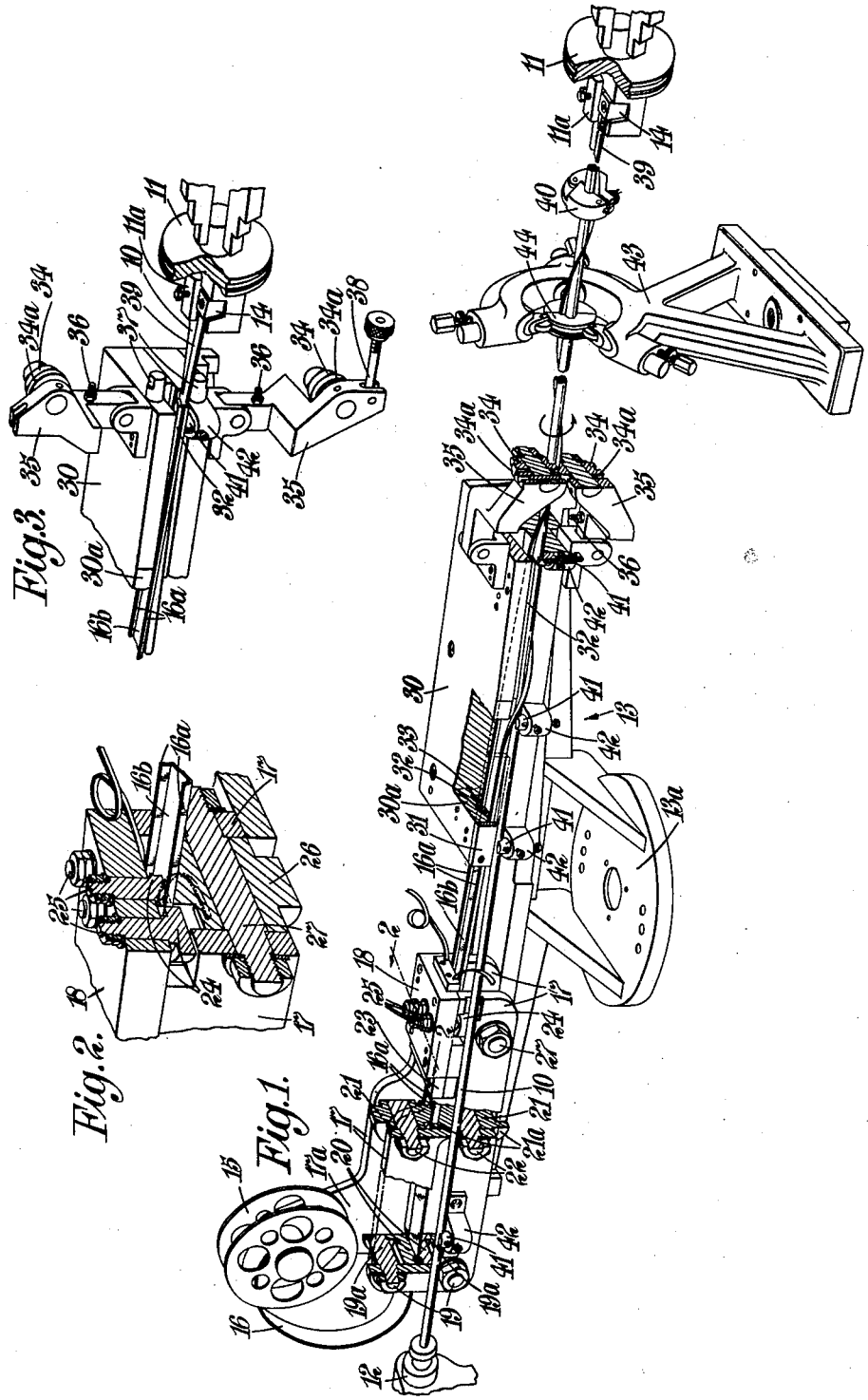

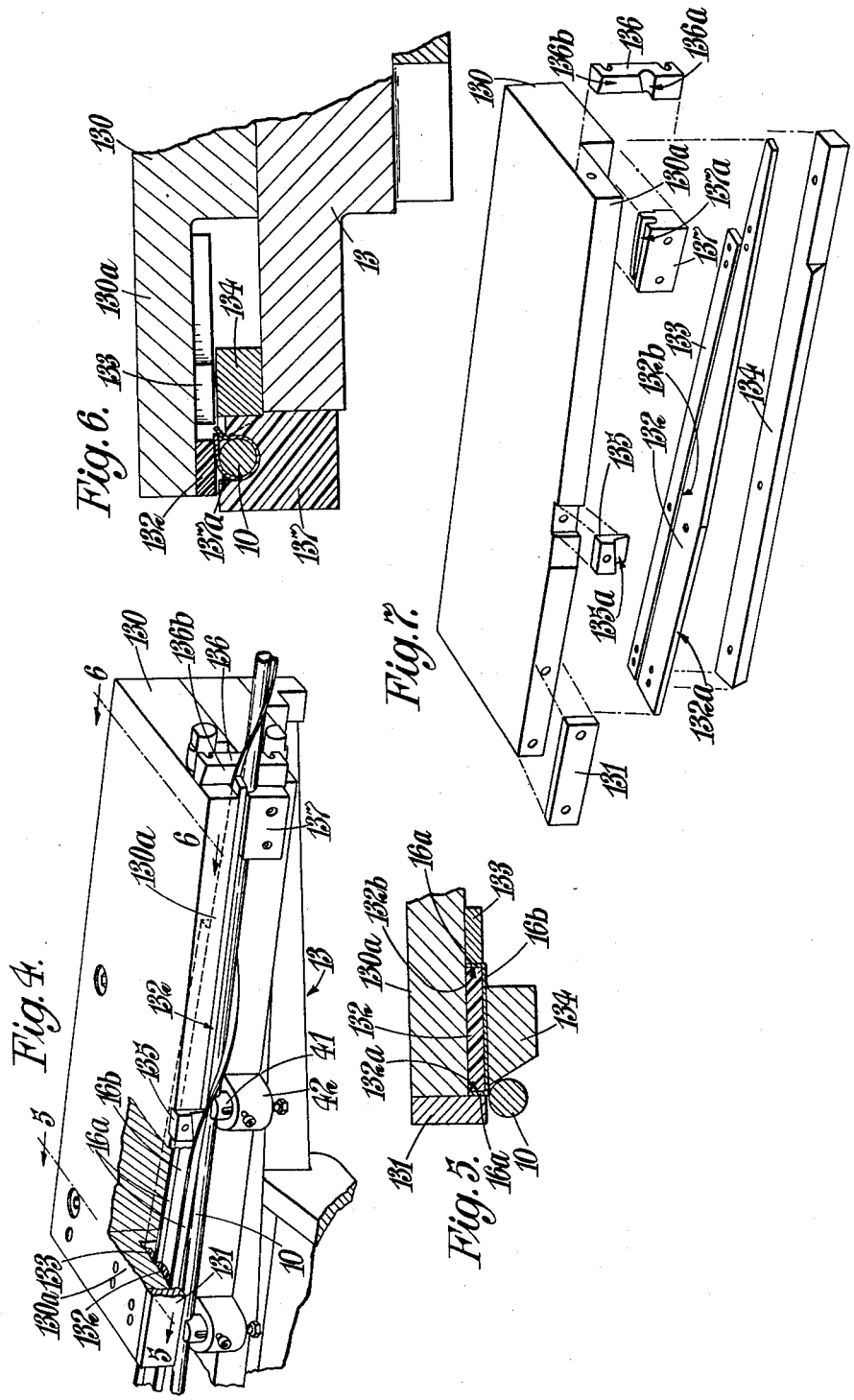

United States Patent Office 3,152,567
Patented Oct. 13, 1964

3,152,567
METHOD OF FORMING TUBES WITH
A HELICAL FIN
Roy Fielden, Skipton, England, assignor to Rolls-Royce
Limited, Derby, England, a British company
Filed Nov. 9, 1960, Ser. No. 68,180
Claims priority, application Great Britain, Nov. 12, 1959,
38,485/59
2 Claims. (Cl. 113—118)

This invention relates to the manufacture of tubes from strip metal, and more particularly the manufacture of tubes having an external helical fin.

According to the present invention, a tube having an external helical fin is manufactured from strip metal by giving the strip a channel section with a base and edge webs, wrapping the channel-section strip on a mandrel in a manner to bring the outer faces of the webs into contact, providing a helical twist in the strip and joining the webs together as by welding to form the fin.

According to a preferred method of the present invention, a tube having an external helical fin is manufactured from strip metal by the steps of giving the strip a channel section with a base and edge webs, then helically wrapping the channel-section strip on a mandrel in a manner to bring the outer faces of the webs into contact and then joining the webs together as by welding to form the fin.

Preferably, the channelling and wrapping steps are performed as a continuous process, the step of joining the webs being performed subsequently or as a part of the continuous process. When the web joining step is performed subsequently, the webs may be held together temporarily in any convenient manner, for instance by clamps, to prevent unwrapping of the strip.

If desired, the webs may be trimmed between the channelling and wrapping steps to ensure that the webs are of equal depth.

One form of machine for practicing the above method will now be described with reference to the accompanying drawings, in which:

FIGURE 1 shows the machine in perspective, parts being broken away to show constructional details, FIGURE 2 is a section on the line 2—2 of FIGURE 1, FIGURE 3 is a fragmentary view showing the positions of parts of the machine at the commencement of operation, FIGURE 4 illustrates an alternative construction of part of the machine, FIGURES 5 and 6 are sections on the lines 5—5 and 6—6 respectively, and FIGURE 7 is an exploded view of the parts of the machine shown in FIGURES 4 to 6.

The machine is of the lathe type and comprises a machine bed (not shown), a cylindrical rod-like mandrel 10 which is secured at one end by a clamp 11a in a driven head stock 11 for rotating the rod about its axis, and which is supported at its other end in a tail stock 12, the head and tail stocks 11, 12 being mounted on the machine bed, and a carriage 13 adapted by a base portion 13a to be mounted on a saddle which is traversed by a lead screw along the machine bed in a direction parallel to the mandrel 10.

The head stock 11 also has a clamp 14 by which one end of the strip 16 to be treated is gripped, the clamp 14 being radially offset from the axis of rotation of the head stock 11 and mandrel 10.

At its end remote from the head stock 11, the carriage 13 has mounted on it a structure (FIGURES 1 and 2) comprising a pair of side plates 17 which are joined at one end by a top plate 18 and at the opposite end by bolts 19 having shank portions 19a forming spacers for the side plates 17. One side plate 17 has an upwardly projecting lug 17a on which is mounted a reel 15 forming a holder for the strip metal 16.

The bolts 19 also retain in position a pair of guide blocks 20 between which the strip 16 passes after being drawn from the reel 15 and before being fed between a bank of channelling rollers 21 which are journalled in the side plates 17 by spindles 22. The lower roller 21 has end flanges 21a between which the upper roller 21 projects and in passing through the bite of the rollers 21, the edge portions of the strip 16 are turned upwardly by the flanges 21a to form webs 16a at right angles to the base portion 16b of the now channel-section strip.

A slotted guide 23 is secured to the side plates 17 to guide the channel-section strip from the channelling rollers 21 into two pairs of roller-type shears 24 (FIGURE 2) which trim the webs 16a to be of equal depth, the shear rollers being carried by spindles 25 journalled in the top plate 18. During shearing, the base portion 16b is supported by a roller 26 carried on a spindle 27 mounted in the side plates 17.

At its end nearer the head stock 11, the carriage 13 has mounted on it guide means which assist the operation of wrapping the channel-section strip on the mandrel 10. The guide means (FIGURES 1 and 3) comprise a block 30 having a heavy flange 30a overhanging the mandrel and channel-section strip, the flange 30a having secured to it a guide strip 31 which contacts the outer surface of one web 16a and which terminates part way along the block 30, a guide bar 32 which lies within the channel and gradually decreases in width towards the head stock 11, and a second guide bar 33 which contacts the outer surface of the other web 16a and extends part way only towards the head-stock end of the block 30.

The longitudinal centre line of the channel-section strip is a small angle to the mandrel 10 and thus by moving the carriage 13 away from the head stock 11 whilst simultaneously rotating the mandrel 10 and the end of the strip which is secured by the clamp 14, the channel-section strip is wrapped helically on the mandrel 10, and by correlating the travel of the carriage 13 with the rotation of the head stock 11, it can be arranged that the outer surfaces of the webs 16a are brought into contact to form the required helix.

At the outlet end of the guide means, the contacting webs 16a are gripped between flanges 34a of a pair of rollers 34 journalled in swinging brackets 35 which are pivoted to the block 30 and carriage 13 respectively. The rollers 34 are located in their operative positions by adjustable stops 36 on the brackets 35 engaging flats on projections 37 (see FIGURE 3) and they are held in this position by a releasable tie bolt 38 joining the brackets.

In operation, a tang 39 is formed at the leading end of the strip 16 and the strip 16 is fed through the channelling rollers 21, trimming shears 24 and guide means 30-33 until the tang 39 projects from the guide means, the clamping rollers 34 being in the position shown in FIGURE 3. The tang 39 is next secured to the head stock 11 by the clamp 14 and the parts are then as shown in FIGURE 3. The head stock 11 and mandrel 10 are now rotated and the carriage 13 is moved away from the head stock 11 so that wrapping of the channel-section strip 16a, 16b on the mandrel commences and after a short time the clamping rollers 34 are brought into the position of FIGURE 1 to grip the abutting webs 16a. The operation is now continued, and strip 16 is gradually drawn from the reel 15, shaped to channel form in the rollers 21, trimmed in the shears 24, and then continuously wrapped helically around the mandrel 10.

As the length of mandrel and wrapped strip projecting from the guide means increases clamps 40 are put in position to prevent separation of the webs 16a.

The mandrel 10 is supported in its length by vertically adjustable U-section plungers 41 which are housed in bores in bosses 42 on the carriage 13, and may also be supported by a steady 43 mounted on the machine bed and carrying a rotatable two-piece guide 44 which embraces the wound strip.

In one method of manufacture, the mandrel 10 after being wrapped with a length of strip, is removed from the machine and the webs 16a are then welded together in a seam welding machine, the clamps 40 being removed as welding proceeds.

In another method, a tack or spot welding operation is effected to join the contacting webs at intervals of say 0.8 inch whilst the wrapping operation is proceeding, this welding being effected for instance close to the outlet of the guide means. On removal of the tube from the machine and after degreasing, the fin is double run seam-welded, the bore of the tube is sized by drawing through it a plug of suitable material, for instance nylon, and then the helical fin on the tube is trimmed to size.

Referring now to FIGURES 4 to 7, there is shown an alternative arrangement of the guide means. The guide means illustrated comprises a block 130 secured to the carriage 13 and having a heavy flange 130a overhanging the mandrel 10 and the channel section strip. The guides include a short guide strip 131 secured to the side edge of the flange 130a to project downwardly beyond it, guide strips 132, 133 secured to the undersurface of the flange 130a, a bar 134 secured to the carriage below the strips 132, 133, a spiral guide 135 which is secured to the side edge of the flange 130a beyond the end of the guide strip 131 and which has a shaped surface 135a to assist in initial deflection of the left hand web 16a into its correct helical path, a final guide 136 secured to the flange 130a at the outlet end of the guide means, and a guide block 137 which is mounted on the carriage 13 adjacent the final guide 136 and which has a channel 137a embracing the mandrel 10 and the wrapped strip.

In operation, the guide strip 131 and the edge 132a of the guide strip 132 maintains the left hand web 16a straight until the channel section strip, the base 16b of which is supported by the top surface of bar 134, almost reaches the point at which the surface 135a of the spiral guide engages and deflects the left hand web 16a into a helical path around the mandrel 10. The edge 132a of the guide strip 132 and the guide strip 133, which is somewhat shorter than the strip 132, lie one on each side of the right hand web 16a and support it until the left hand web 16a has almost completed its helical path to its final position in which the webs are in contact. The bar 134 supports the base portion 16b of the channel section strip but is set parallel to the mandrel 10 so that as the strip moves through the guide means the base 16b is displaced laterally of the bar 134 to allow it to wrap around the mandrel, the top surface 134a of the bar being substantially level with the top side of the mandrel. The channel 137a in the guide block 137 receives the almost completely wrapped strip and maintains the strip in position around the mandrel 10 during the end portion of the travel of the strip through the guide means. The final guide 136 by its surface portion 136a partially embraces the wrapped strip and has a surface portion 136b which co-operates with the extreme end of guide strip 132 to bring the webs 16a in contact.

The webs 16a are preferably stitch welded immediately after leaving the parts 132, 136 and subsequently double seam welded along the whole length permanently to secure them together.

The method above described is especially suitable for the manufacture of finned casings of fuel elements for nuclear reactors. These casings can be used for fuel elements as described in United States application Serial No. 857,836, filed December 7, 1959, now U.S. Patent No. 3,096,264.

I claim:

1. A method of manufacturing a tube having an external helical fin from strip metal comprising the operations of forming the strip into a channel section with a base and two edge webs, trimming the two edge webs to be of equal height, guiding the channel section strip obliquely onto a rotating mandrel, and deflecting the edge web which first approaches the mandrel so that the base web of the strip is wrapped helically on the mandrel and the outer surfaces of the edge webs are brought into contact.

2. A method according to claim 1 wherein the edge webs of the wrapped strip, after being brought into contact, are pressed together to form a helical fin externally of the tube, and subsequently permanently joined as by welding.

References Cited in the file of this patent

UNITED STATES PATENTS

| | | |
|---|---|---|
| 1,294,465 | Horvath | Feb. 18, 1919 |
| 1,706,393 | Fay | Mar. 26, 1929 |
| 2,233,233 | Williams | Feb. 22, 1941 |
| 2,379,879 | Bronander | July 10, 1945 |
| 2,513,349 | Nase | July 4, 1950 |
| 2,714,447 | Gardes | Aug. 2, 1955 |
| 2,782,743 | Kennedy | Feb. 26, 1957 |
| 2,807,074 | Schroeder | Sept. 24, 1957 |
| 2,821,772 | Billeter | Feb. 4, 1958 |